(12) United States Patent
Enami

(10) Patent No.: US 10,108,057 B2
(45) Date of Patent: Oct. 23, 2018

(54) ELECTRO-OPTICAL DEVICE AND ELECTRONIC APPARATUS

(71) Applicant: SEIKO EPSON CORPORATION, Tokyo (JP)

(72) Inventor: Shinta Enami, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/696,465

(22) Filed: Sep. 6, 2017

(65) Prior Publication Data

US 2018/0088386 A1    Mar. 29, 2018

(30) Foreign Application Priority Data

Sep. 28, 2016   (JP) .................. 2016-190419

(51) Int. Cl.
*G02F 1/13*    (2006.01)
*G09G 3/36*    (2006.01)
*G02F 1/1345*  (2006.01)

(52) U.S. Cl.
CPC ....... *G02F 1/13452* (2013.01); *G09G 3/3648* (2013.01); *G09G 2300/0426* (2013.01)

(58) Field of Classification Search
CPC .............. G02F 1/13452; G09G 3/3648; G09G 2300/0426

USPC .......................................................... 361/749
See application file for complete search history.

(56) References Cited

U.S. PATENT DOCUMENTS 6,411,353 B1 *   6/2002  Yarita ............... G02F 1/133308
                                                        349/150
2014/0240933 A1 * 8/2014  Lee .................. G06F 1/1656
                                                        361/749
2017/0358847 A1 * 12/2017 Cho .................. H01Q 1/243

FOREIGN PATENT DOCUMENTS

JP        2015-056465 A      3/2015

* cited by examiner

*Primary Examiner* — Michael P McFadden
(74) *Attorney, Agent, or Firm* — Oliff PLC

(57) ABSTRACT

An electro-optical device includes a first flexible board, a second flexible board and an integrated circuit mounted on the first flexible board, the flexible board is connected between an electro-optical panel and the second flexible board and includes a single-layered wiring layer, the second flexible board is connected to an external apparatus and includes a multilayered wiring layer, the single-layered wiring layer includes a first video signal wiring and a first ground wiring, a first wiring layer of the multilayered wiring layer includes a second video signal wiring connected to the first video signal wiring, a second wiring layer of the multilayered wiring layer includes a second ground wiring which is connected to the first ground wiring and is formed at a position opposite to the second video signal wiring.

5 Claims, 12 Drawing Sheets

ELECTRO-OPTICAL DEVICE AND ELECTRONIC APPARATUS

BACKGROUND

1. Technical Field

The present invention relates to an electro-optical device and an electronic apparatus including the electro-optical device.

2. Related Art

Electro-optical devices for displaying an image using liquid crystal elements have been widely developed. In the electro-optical device, by supplying a voltage according to designated gradation of each pixel to each pixel via a data line, and controlling transmittance of a liquid crystal included in each pixel to transmittance according to the designated gradation, the designated gradation is displayed on each pixel.

On the other hand, in a method of driving a liquid crystal panel by using a driving circuit incorporated in the liquid crystal panel in which the pixels are arrayed and a driver IC which is a driving circuit provided on a flexible printed circuit board, as resolution of the liquid crystal panel is increased, improvement in driving capability of the driver IC and provision of a plurality of driver ICs have been promoted.

As a video signal which is input from an external apparatus to the driving circuit, a differential signal is used since the video signal requires large amounts of data. Thus, wirings for supplying the video signal are used in a unit of one pair of wirings. In this case, from a viewpoint of impedance matching and suppression of electro-magnetic interference (EMI), it is necessary to provide a ground wiring in the immediate vicinity of one pair of wirings.

Generally, in order to realize impedance matching of the wiring for supplying the differential signal and suppression of EMI of the wiring, a structure in which a ground wiring is provided on both sides of one pair of wirings is used, or a microstrip structure is used as disclosed in JP-A-2015-56465.

However, for a reason such as suppression of an increase in manufacturing cost, as the flexible printed circuit board to which the liquid crystal panel is attached, a single-sided wiring board is generally used. In this case, a microstrip structure as disclosed in JP-A-2015-56465 cannot be adopted. In addition, in a case of a flexible printed circuit board as a single-sided wiring board, when providing ground wirings on both sides of one pair of wirings, also in a connector provided for connection between the flexible printed circuit board and the external apparatus for outputting the video signal, it is necessary to provide ground terminals corresponding to the ground wirings provided on both sides of one pair of wirings. The provision of the ground terminals is increasing with the increase in resolution. As a result, layout of the wirings on the flexible printed circuit board is also restricted, and this leads to reduction of layout efficiency.

SUMMARY

An advantage of some aspects of the invention is to provide an electro-optical device capable of improving layout efficiency of a flexible printed circuit board while realizing impedance matching with respect to a differential signal and EMI suppression without significantly increasing manufacturing cost even in a case of an increase in resolution, and an electronic apparatus including the electro-optical device.

According to an aspect of the invention, there is provided an electro-optical device including: an electro-optical panel that displays an image relating to a video signal as a differential signal supplied from an external apparatus; an integrated circuit that supplies an image signal for displaying the image to the electro-optical panel based on the video signal; a first flexible printed circuit board that includes one end connected to the electro-optical panel, and a single-layered wiring layer between the first flexible printed circuit board and a mounted portion of the integrated circuit; a second flexible printed circuit board that includes one end connected to the external apparatus, and a multilayered wiring layer; in which the other end of the first flexible printed circuit board and the other end of the second flexible printed circuit board are connected to each other, in which the single-layered wiring layer of the first flexible printed circuit board includes a first video signal wiring through which the video signal is supplied to the integrated circuit and a first ground wiring that is connected to ground potential, in which the multilayered wiring layer of the second flexible printed circuit board includes at least a first wiring layer and a second wiring layer, in which the first wiring layer includes a second video signal wiring to which the video signal is supplied from the external apparatus and which is connected to the first video signal wiring, and in which the second wiring layer includes a second ground wiring that is connected to the first ground wiring and is formed at a position opposite to the second video signal wiring.

According to the aspect of the invention, the other end of the first flexible printed circuit board that includes one end connected to the electro-optical panel, and the single-layered wiring layer between the first flexible printed circuit board and the mounted portion of the integrated circuit, is connected to the other end of the second flexible printed circuit board that includes one end connected to the external apparatus, and the multilayered wiring layer. The video signal as a differential signal supplied from the external apparatus is supplied to the second video signal wiring included in the first wiring layer of the second flexible printed circuit board, and is supplied to the first video signal wiring which is connected to the second video signal wiring and is included in the wiring layer of the first flexible printed circuit board. The second wiring layer of the second flexible printed circuit board includes the second ground wiring that is connected to the first ground wiring included in the wiring layer of the first flexible printed circuit board and is formed at a position opposite to the second video signal wiring. Therefore, even in a case where the video signal as a differential signal is supplied to the second video signal wiring, it is possible to realize impedance matching and EMI suppression by the second ground wiring formed at the position opposite to the second video signal wiring. In addition, according to the aspect of the invention, by connecting the first flexible printed circuit board with the single-layered wiring layer and the second flexible printed circuit board with the multilayered wiring layer to each other, instead of configuring the entire of the flexible printed circuit board with a multilayered flexible printed circuit board, it is possible to realize the above-described configuration without significantly increasing a manufacturing cost. Further, according to the aspect of the invention, on the side of the second flexible printed circuit board on which the second video signal wiring is provided, there is no need to provide a ground wiring across the entire area of the second flexible printed circuit board, being an area from the other end of the second flexible printed circuit board connected to the other end of the first flexible printed circuit board to one end of the second flexible printed circuit board connected to the external apparatus. Thus, it is possible to reduce the number of ground terminals of a connector provided at a portion in which the second flexible printed circuit board and the external apparatus are connected to each other, thereby improving layout efficiency of the second flexible printed circuit board.

In the electro-optical device according to the aspect, the first wiring layer may include the second video signal wiring and a third ground wiring connected to the first ground wiring, and the third ground wiring may be connected to the second ground wiring via a through-hole. According to the aspect of the invention, the first wiring layer includes the second video signal wiring and the third ground wiring connected to the first ground wiring, and on the other hand, the third ground wiring is connected to the second ground wiring via the through-hole. Thus, it is possible to reduce the number of ground terminals of connector provided at the portion in which the second flexible printed circuit board and the external apparatus are connected to each other, thereby improving layout efficiency of the second flexible printed circuit board. In addition, even in a case where the video signal as a differential signal is supplied to the second video signal wiring, it is possible to realize impedance matching and EMI suppression by the second ground wiring formed at the position opposite to the second video signal wiring. Further, according to the aspect of the invention, by connecting the first flexible printed circuit board with the single-layered wiring layer and the second flexible printed circuit board with the multilayered wiring layer to each other, instead of configuring the entire of the flexible printed circuit board with a multilayered flexible printed circuit board, it is possible to realize the above-described configuration without significantly increasing a manufacturing cost.

In the electro-optical device according to the aspect, the through-hole may be provided in the vicinity of a portion in which the other end of the first flexible printed circuit board and the other end of the second flexible printed circuit board are connected to each other, and the second video signal wiring and the second ground wiring may form a microstrip line. According to the aspect of the invention, the first wiring layer includes substantially only the second video signal wiring, and thus it is possible to improve layout efficiency of the second flexible printed circuit board. In addition, since the microstrip line can be formed, even in a case where the video signal as a differential signal is supplied to the second video signal wiring, it is possible to realize impedance matching and EMI suppression by the second ground wiring formed at the position opposite to the second video signal wiring. Further, according to the aspect of the invention, by connecting the first flexible printed circuit board with the single-layered wiring layer and the second flexible printed circuit board with the multilayered wiring layer to each other, instead of configuring the entire of the flexible printed circuit board with a multilayered flexible printed circuit board, it is possible to realize the above-described configuration without significantly increasing a manufacturing cost.

According to still another aspect of the invention, there is provided an electronic apparatus including the electro-optical device according to the aspect of the invention. The electronic apparatus is an electronic apparatus with good display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
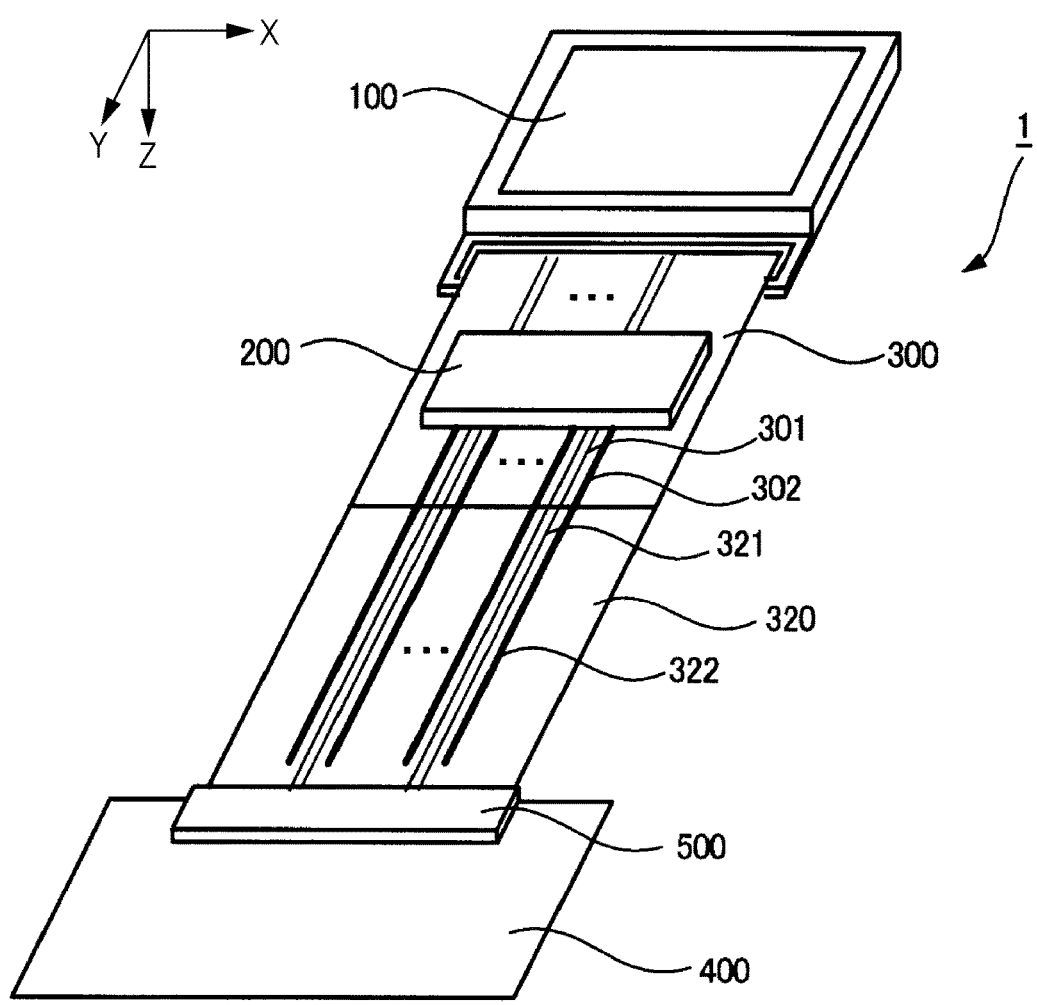
FIG. 1 is an explanatory diagram of an electro-optical device according to a first embodiment of the invention.

A first embodiment according to the invention will be described with reference to FIGS. 1 to 14. FIG. 1 is a diagram illustrating a configuration of a signal transmission system of an electro-optical device 1.

As illustrated in FIG. 1, the electro-optical device 1 includes an electro-optical panel 100, a driving integrated circuit (driver IC) 200 for displaying an image on the electro-optical panel 100 based on a video signal, a first flexible printed circuit board 300, and a second flexible printed circuit board 320. The electro-optical panel 100 is connected to one end of the first flexible printed circuit board 300 on which the driving integrated circuit 200 is mounted. One end of the second flexible printed circuit board 320 is connected to a board 400 of a host CPU apparatus (not illustrated) via a connector 500. The other end of the first flexible printed circuit board 300 and the other end of the second flexible printed circuit board 320 are connected to each other, as illustrated in FIG. 1.

The first flexible printed circuit board 300 is a flexible printed circuits (FPC) board on which the driving integrated circuit 200 is mounted by a chip on film (COF) mounting structure. A single-layered wiring layer is formed on the first flexible printed circuit board 300. A plurality of first video signal wirings 301 for supplying a video signal to the driving integrated circuit 200 are formed on the wiring layer. In addition, a plurality of first ground wirings 302 connected to ground potential are formed on the wiring layer.

The driving integrated circuit 200 is electrically and mechanically fixed to the first flexible printed circuit board 300 by a COF mounting structure using a tape automated bonding (TAB) technology.

The second flexible printed circuit board 320 is a PFC with a two-layered wiring layer. When seen from a Z direction illustrated in FIG. 1, the second flexible printed circuit board 320 includes a first wiring layer on the front side and a second wiring layer on the back side. In addition, the second flexible printed circuit board 320 includes second video signal wirings 321, a second ground wiring 323, and third ground wirings 322. A plurality of second video signal wirings 321 to which a video signal is supplied from the host CPU apparatus via the connector 500 and to which the first video signal wirings 301 are connected, are formed on the first wiring layer. In addition, a plurality of third ground wirings 322 connected to the first ground wirings 302 are formed on the first wiring layer. Although not illustrated in FIG. 1, the second ground wiring to which the third ground wirings 322 are connected via through-holes and to which the first ground wirings are connected via the third ground wirings 322, is formed on the second wiring layer. The second ground wiring on the back surface of the second flexible printed circuit board 320 is formed at a position opposite to the second video signal wirings 321.

Figure 2:
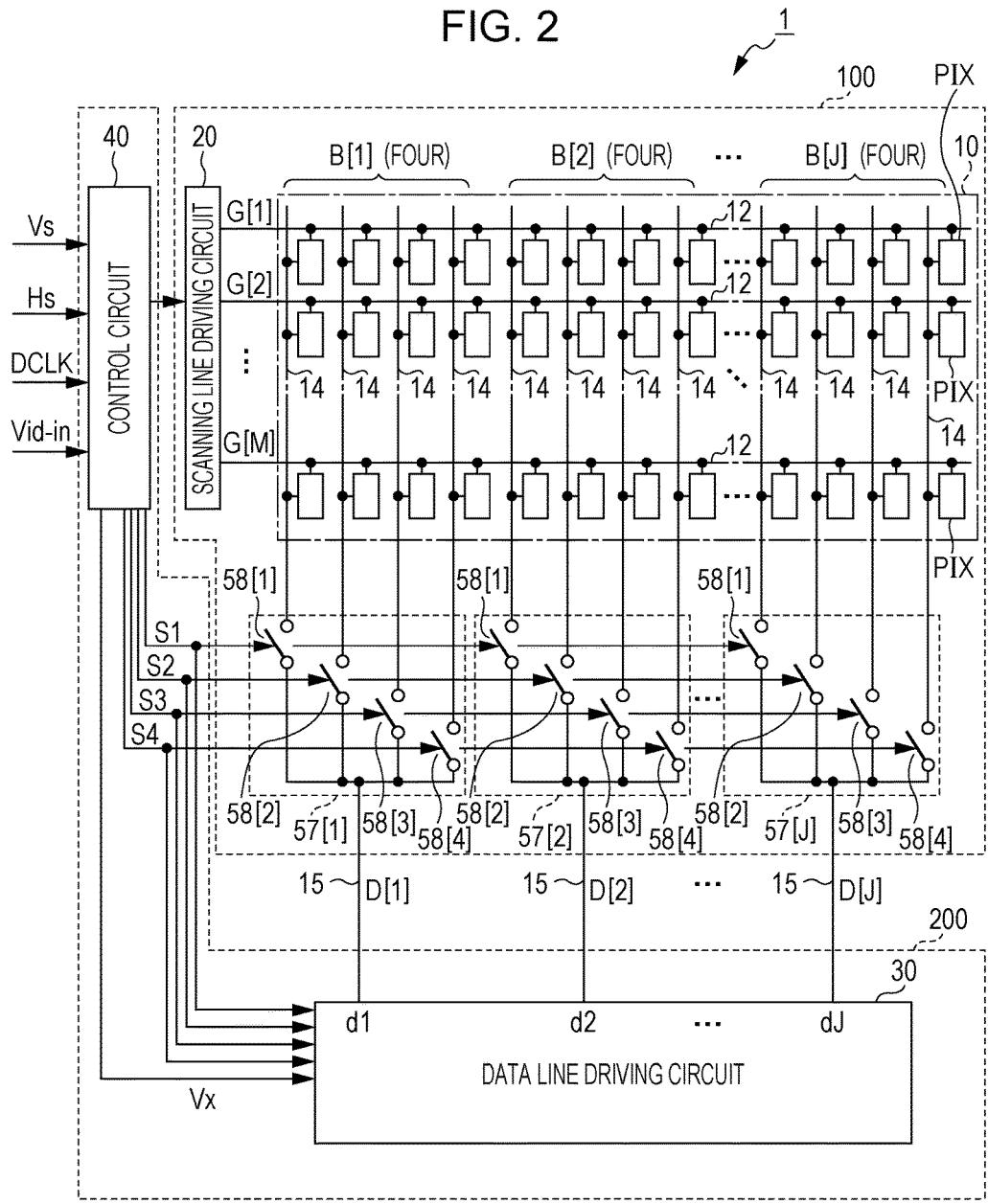
FIG. 2 is a block diagram illustrating a configuration of the electro-optical device according to the embodiment.

FIG. 2 is a block diagram illustrating configurations of the electro-optical panel 100 and the driving integrated circuit 200. As illustrated in FIG. 2, the electro-optical panel 100 includes a pixel unit 10, a scanning line driving circuit 20, and J demultiplexers 57[1] to 57[J] (J is a natural number). The driving integrated circuit 200 includes a data line driving circuit 30 and a control circuit 40.

In the pixel unit 10, M scanning lines 12 and N data lines 14 that intersect with each other are formed (M and N are natural numbers). A plurality of pixel circuits (pixels) PIX are provided corresponding to respective intersections between the respective scanning lines 12 and the respective data lines 14, and are arranged in a matrix shape of M rows in the longitudinal direction×N columns in the transverse direction.

Figure 3:
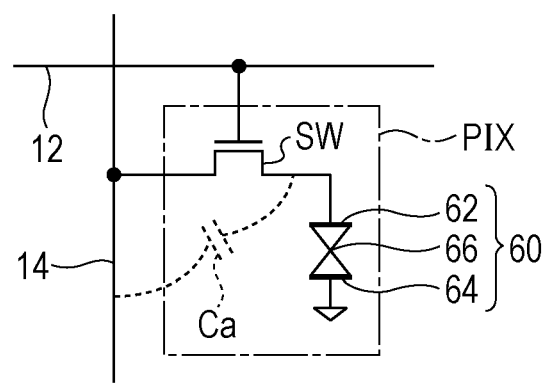
FIG. 3 is a circuit diagram illustrating a configuration of a pixel.

FIG. 3 is a circuit diagram of each pixel circuit PIX. As illustrated in FIG. 3, each pixel circuit PIX includes a liquid crystal element 60 and a switching element SW such as a TFT. In the present embodiment, a TFT is used as an example of the switching element SW. The liquid crystal element 60 is an electro-optical element that is configured with a pixel electrode 62 and a common electrode 64 which are opposite to each other and a liquid crystal 66 interposed between both electrodes. Transmittance (display gradation) of the liquid crystal 66 changes according to a voltage applied between the pixel electrode 62 and the common electrode 64. A configuration in which an auxiliary capacitor is connected to the liquid crystal element 60 in parallel, may be adopted. The switching element SW is configured with, for example, an N-channel type transistor of which the gate is connected to the scanning line 12. The switching element SW is provided between the liquid crystal element 60 and the data line 14, and controls electrical connection (conduction/non-conduction) between the liquid crystal element 60 and the data line 14. When a scanning signal G[m] is set to selection potential, the switching element SW of each pixel circuit PIX in the m-th row simultaneously transitions to an ON state (m is a natural number of 1 to M).

When the scanning line 12 corresponding to the pixel circuit PIX is selected and the switching element SW of the pixel circuit PIX is controlled to become an ON state, a voltage according to an image signal D[n] (n is a natural number from 1 to J) which is supplied from the data line 14 to the pixel circuit PIX, is applied to the liquid crystal element 60. As a result, transmittance of the liquid crystal 66 of the pixel circuit PIX is set to transmittance according to the image signal D[n]. When a light source (not illustrated) becomes an ON (turn-on) state and light is emitted from the light source, the light passes through the liquid crystal 66 of the liquid crystal element 60 included in the pixel circuit PIX, and proceeds toward an observer. That is, when the voltage according to the image signal D[n] is applied to the liquid crystal element 60 and the light source becomes an ON state, the pixel corresponding to the pixel circuit PIX displays gradation according to the image signal D[n].

After the voltage according to the image signal D[n] is applied to the liquid crystal element 60 of the pixel circuit PIX, when the switching element SW becomes an OFF state, ideally, the applied voltage corresponding to the image signal D[n] is held. Therefore, ideally, each pixel displays the gradation according to the image signal D[n] during a period from when the switching element SW becomes an ON state to when the switching element SW becomes an ON state next time.

As illustrated in FIG. 3, parasitic capacitance Ca is present between the data line 14 and the pixel electrode 62 (or between the data line 14 and a wiring for electrically connecting the pixel electrode 62 and the switching element SW). For this reason, during a period for which the switching element SW is in an OFF state, there is a case where a change in potential of the data line 14 propagates to the pixel electrode 62 via the capacitance Ca and the applied voltage of the liquid crystal element 60 changes.

In addition, a common voltage LCCOM, which is a constant voltage, is supplied to the common electrode 64 via a common line (not illustrated). As the common voltage LCCOM, a voltage with a difference of approximately −0.5 V when the center voltage of an amplitude of the image signal D[n] is 0 V, is used. This is due to characteristics of the switching element SW and the like.

In the present embodiment, in order to prevent so-called ghosting, polarity inversion driving that inverts polarity of the voltage applied to the liquid crystal element 60 at a predetermined period, is adopted. In this example, a level of the image signal D[n] supplied to the pixel circuit PIX via the data line 14 is inverted with respect to the center voltage of the image signal D[n], for each unit period. The unit period is a period of an operation as one unit that drives the pixel circuit PIX. In this example, the unit period is the vertical scanning period V. Here, the unit period may be arbitrarily set, and for example, may be a natural number times the vertical scanning period V. In the present embodiment, a case where the voltage of the image signal D[n] becomes a higher voltage than the center voltage thereof is represented as positive polarity, and a case where the voltage of the image signal D[n] becomes a lower voltage than the center voltage thereof is represented as negative polarity.

Returning to FIG. 2, a vertical synchronization signal Vs that defines a vertical scanning period V, a horizontal synchronization signal Hs that defines a horizontal scanning period H, a dot clock signal DCLK, and a video signal Vid-in are input to the control circuit 40 from an external host CPU apparatus (not illustrated). The control circuit 40 performs synchronization control of the scanning line driving circuit 20 and the data line driving circuit 30 based on the signals. Under the synchronization control, the scanning line driving circuit 20 and the data line driving circuit 30 control display of the pixel unit 10 in cooperation with each other.

Typically, display data constituting one display screen is processed in a frame unit, and the processing period is one frame period (1F). The frame period F corresponds to the vertical scanning period V in a case where one display screen is formed by one vertical scanning.

The scanning line driving circuit 20 outputs scanning signals G[1] to G[M] to the respective M scanning lines 12. In response to output of the horizontal synchronization signal Hs from the control circuit 40, the scanning line driving circuit 20 sequentially sets the scanning signals G[1] to G[M] for the respective scanning lines 12, to an active level, for one horizontal scanning period (1H), within the vertical scanning period V.

Here, during a period for which the scanning signal G[m] corresponding to the m-th row is set to an active level and the scanning line corresponding to the m-th row is selected, the respective switching elements SW of the N pixel circuits PIX in the m-th row become an ON state. As a result, the respective N data lines 14 are electrically connected to the respective pixel electrodes 62 of the N pixel circuits PIX in the m-th row via the respective switching elements SW.

In the present embodiment, the N data lines 14 in the pixel unit 10 are divided into J wiring blocks B[1] to B[J] (J=N/4) each with four data lines 14 as a unit that are adjacent to each other. In other words, the data lines 14 are grouped for each wiring block B. The demultiplexers 57[1] to 57[J] correspond to the J wiring blocks B[1] to B[J], respectively. As will be described later, in the present embodiment, since the data lines 14 are divided into units each with four data lines 14, the image signal D[n] includes a data voltage for four pixels.

Each demultiplexer 57[j] is configured with four switches 58[1] to 58[4] (j is a natural number from 1 to J). In each demultiplexer 57[j], one contact of each of the four switches 58[1] to 58[4] is commonly connected to a point. The point, which is commonly connected to the one contact of each of the four switches 58[1] to 58[4] in each demultiplexer 57[j], is connected to each of J VID signal lines 15. The J VID signal lines 15 are connected to the data line driving circuit 30 of the driving integrated circuit 200 via the first flexible printed circuit board 300.

In addition, in each demultiplexer 57[j], the other contact of each of the four switches 58[1] to 58[4] is connected to each of the four data lines 14 constituting the wiring block B[j] corresponding to the demultiplexer 57[j].

ON/OFF of each of the four switches 58[1] to 58[4] in each demultiplexer 57[j] is switched by each of four selection signals S1 to S4. The four selection signals S1 to S4 are supplied from the control circuit 40 of the driving integrated circuit 200 via the flexible printed circuit board 300. Here, for example, in a case where one selection signal S1 becomes an active level and the other three selection signals S2 to S4 become a non-active level, the J switches 58[1] belonging to each demultiplexer 57[j] become an ON state.

Thus, each demultiplexer 57[j] outputs each of the image signals D[1] to D[J] on the J VID signal lines 15, to the first data line 14 of each of the wiring blocks B[1] to B[J]. Thereafter, in the same manner, each demultiplexer 57[j] outputs each of the image signals D[1] to D[J] on the J VID signal lines 15, to the second, third, and fourth data lines 14 of each of the wiring blocks B[1] to B[J].

The control circuit 40 generates various control signals, and controls each unit in synchronization with the vertical synchronization signal Vs, the horizontal synchronization signal Hs, and the dot clock signal DCLK. As will be described in detail later, the control circuit 40 outputs an analog data signal Vx by processing the digital video signal Vid-in supplied from the host CPU apparatus.

The video signal Vid-in is digital data for designating a gradation level of each pixel in the electro-optical panel 100, and is supplied in a scanning order according to the vertical synchronization signal Vs, the horizontal synchronization signal Hs, and the dot clock signal DCLK.

The data line driving circuit 30 outputs data to be supplied for each row of the pixels to which data is written, to the data lines 14, in cooperation with the scanning line driving circuit 20. The data line driving circuit 30 generates a latch signal based on the selection signals S1 to S4 output from the control circuit 40, and sequentially latches the data signals Vx supplied as serial data. The data signals Vx are grouped as time-series data every four pixels. In addition, the data line driving circuit 30 is provided with a digital to analog (D/A) conversion circuit as a D/A conversion unit, and a voltage amplification unit. The D/A conversion circuit performs D/A conversion based on the grouped digital data and an analog voltage generated by an analog voltage generation circuit (not illustrated), and the voltage amplification unit generates a voltage as analog data by performing amplification. Thus, the data signals Vx which are arranged in a time-series manner in units of four pixels, are also converted into predetermined data voltages. The data voltages for four pixels are supplied from output terminals d1 to dJ to the VID signal lines 15, as image signals D[1] to D[J].

In each demultiplexer 57[j], conduction (ON/OFF) of each of the switches 58[1] to 58[4] is controlled by each of the selection signals S1 to S4 output from the control circuit 40, and each of the switches 58[1] to 58[4] becomes an ON state at a predetermined timing. During a period for which the precharge signal is applied, conduction of each of the switches 58[1] to 58[4] is controlled by each of the selection signals S1 to S4 output from the control circuit 40, and the switches 58[1] to 58[4] of the demultiplexer 57[j] simultaneously become an ON state.

Thus, in one horizontal scanning period (1H), the data voltage D[n] for four pixels that is supplied to each VID signal line 15, is output to the data lines 14 in a time-series manner by the switches 58[1] to 58[4].

Figure 4:
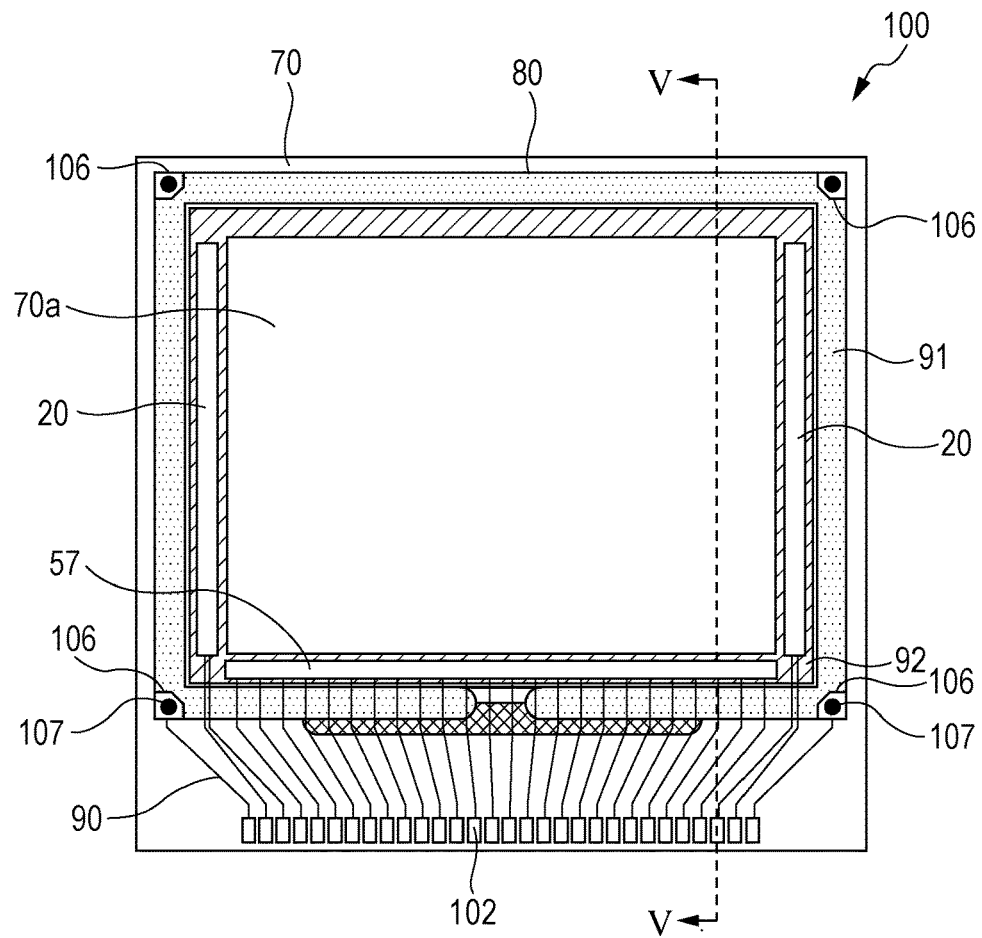
FIG. 4 is a plan view illustrating a TFT array substrate and components formed on the TFT array substrate when seen from a counter substrate.

Next, the electro-optical panel 100 will be described with reference to FIGS. 4 and 5. FIG. 4 is a plan view illustrating a TFT array substrate 70 and components formed on the TFT array substrate 70 when seen from a counter substrate 80, and FIG. 5 is a sectional view taken along a line V-V of FIG. 4.

Figure 5:
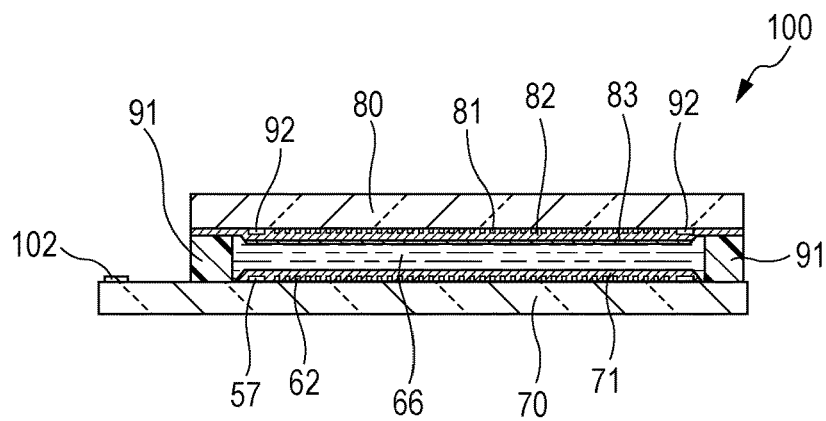
FIG. 5 is a sectional view taken along a line V-V of FIG. 4.

In FIGS. 4 and 5, in the electro-optical panel 100 according to the present embodiment, the TFT array substrate 70 on which TFT switching elements SW are arranged is disposed to be opposite to the counter substrate 80. The TFT array substrate 70 is made of, for example, a transparent substrate such as a quartz substrate or a glass substrate, or a silicon substrate, and the counter substrate 80 is made of, for example, a transparent substrate such as a quartz substrate or a glass substrate. The liquid crystal 66 is sealed between the TFT array substrate 70 and the counter substrate 80. The TFT array substrate 70 and the counter substrate 80 are adhered to each other by sealing members 91 which are provided in a sealing area positioned around an image display area 70a corresponding to the pixel unit 10 in which the plurality of pixels PIX are provided.

The sealing member 91 is made of, for example, a ultraviolet-curable resin, a thermosetting resin, a ultraviolet-curable/thermosetting resin, or the like, which is used for bonding both substrates, and is cured by ultraviolet ray irradiation, heating, or the like after being applied on the TFT array substrate 70 in a manufacturing process. In the sealing member 91, a gap material such as glass fiber or glass beads for maintaining a distance between the TFT array substrate 70 and the counter substrate 80 to a predetermined value, is dispersed. In addition to mix the gap material into the sealing member 91, or instead of mixing the gap material into the sealing member 91, the gap material may be disposed in the image display area 70a or a peripheral area positioned around the image display area 70a.

In FIG. 4, a frame-shaped light shielding film 92 having a light shielding property that defines a frame area of the image display area 70a, is provided on the counter substrate 80 side, in parallel with the inside of the sealing area in which the sealing member 91 is disposed. On the other hand, a portion or the entire portion of the frame-shaped light shielding film 92 may be provided on the TFT array substrate 70 side, as a built-in light shielding film.

External circuit connection terminals 102 are provided in an area among the peripheral area that is positioned outside the sealing area in which the sealing member 91 is disposed, along one side of the TFT array substrate 70. A demultiplexer 57 is provided inside the sealing area along the one side so as to be covered by the frame-shaped light shielding film 92. The scanning line driving circuit 20 is provided inside the sealing area along two sides adjacent to the one side so as to be covered by the frame-shaped light shielding film 92. The external circuit connection terminals 102 includes input terminals for the selection signals S1 to S4, the image signals D[1] to D[J], and power supply, and a ground terminal.

On the TFT array substrate 70, upper and lower conduction terminals 106 for connecting the two substrates to each other using upper and lower conduction members 107 are disposed in areas opposite to four corner portions of the counter substrate 80. Thus, electrical conduction between the TFT array substrate 70 and the counter substrate 80 can be made. In addition, leading wirings 90 for electrical connection between the external circuit connection terminals 102 and the scanning line driving circuit 20 and upper and lower conduction terminals 106, are formed.

In FIG. 5, on the TFT array substrate 70, a stacked structure in which the switching elements SW and wirings such as the scanning lines 12 and the data lines 14 are formed, is formed. Although a detailed configuration of the stacked structure is not illustrated in FIG. 5, the pixel electrode 62 made of a transparent material such as indium tin oxide (ITO), is formed in an island shape with a predetermined pattern for each pixel.

The pixel electrode 62 is formed in the image display area 70a on the TFT array substrate 70 so as to be opposite to the counter electrode 82 to be described later. An alignment film 71 is formed on a surface of the TFT array substrate 70 that faces the liquid crystal 66, that is, on the pixel electrode 62, so as to cover the pixel electrode 62.

A light shielding film 81 is formed on a surface of the counter substrate 80 that is opposite to the TFT array substrate 70. The light shielding film 81 is formed, for example, in a lattice shape when seen in a plan view on the opposite surface of the counter substrate 80. In the counter substrate 80, a non-opening area is defined by the light shielding film 81, and an area partitioned by the light shielding film 81 is an opening area through which light emitted from a projector lamp or a direct-vision type backlight is transmitted. On the other hand, the light shielding film 81 may be formed in a stripe shape, and the non-opening area may be defined by the light shielding film 81 and various components such as the data lines provided on the TFT array substrate 70 side.

Counter electrodes 82 made of a transparent material such as ITO are formed on the light shielding film 81 so as to be opposite to the plurality of pixel electrodes 62. In order to perform color display in the image display area 70a, on the light shielding film 81, a color filter (not illustrated in FIG. 5) may be formed in an area including the opening area and a portion of the non-opening area. An alignment film 83 is formed on a surface of the counter electrode 82 that is opposite to the counter substrate 80.

On the TFT array substrate 70 illustrated in FIGS. 4 and 5, in addition to the scanning line driving circuit 20, the demultiplexer 57, and the like, a precharge circuit which supplies a precharge signal having a predetermined voltage level to each of the plurality of data lines 14 before supply of the image signals, may be formed. In addition, an inspection circuit or the like for inspecting quality, defects, or the like of the liquid crystal device in manufacturing or shipping, may be formed.

Figure 6:
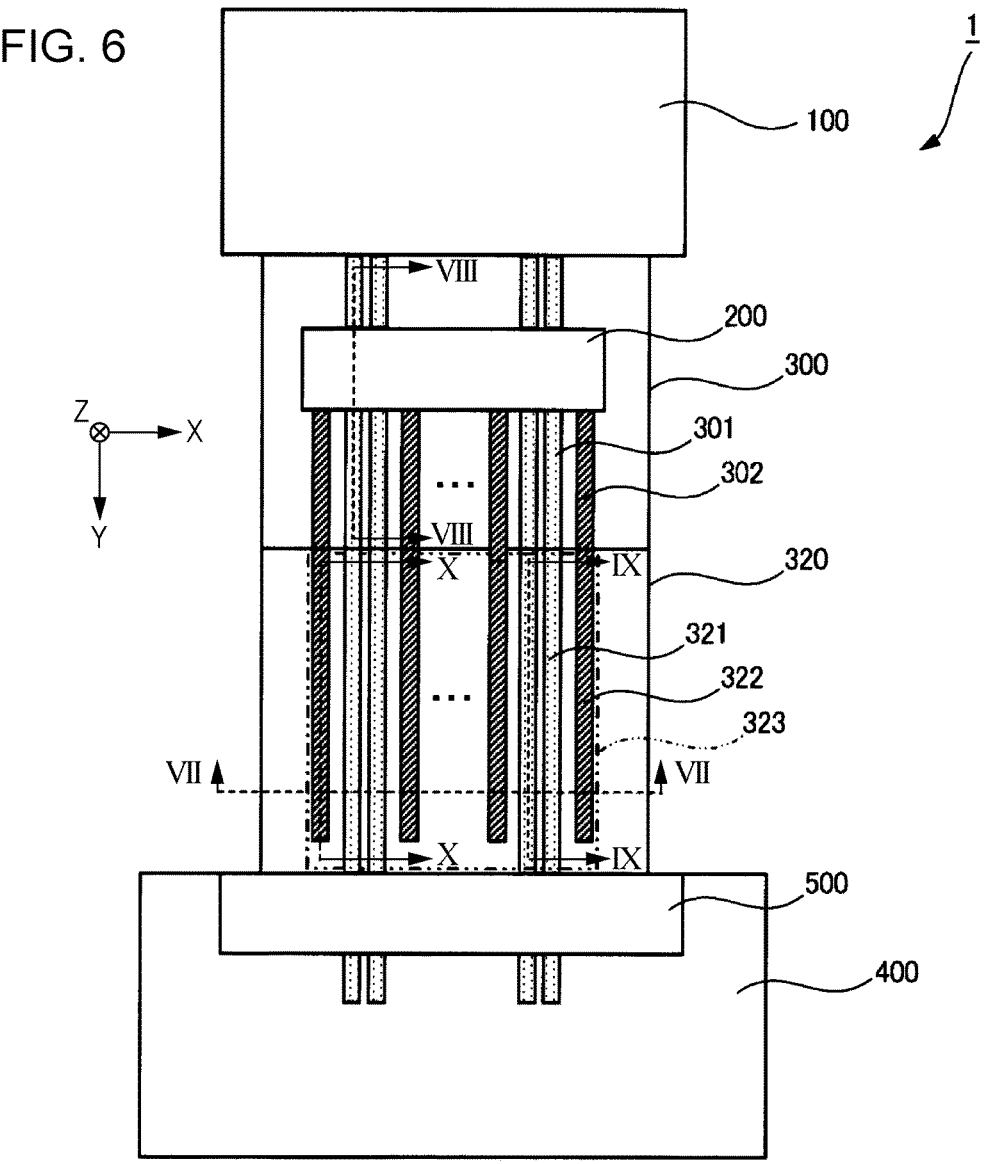
FIG. 6 is a plan view of the electro-optical device connected to a board of a host CPU apparatus.
Figure 7:
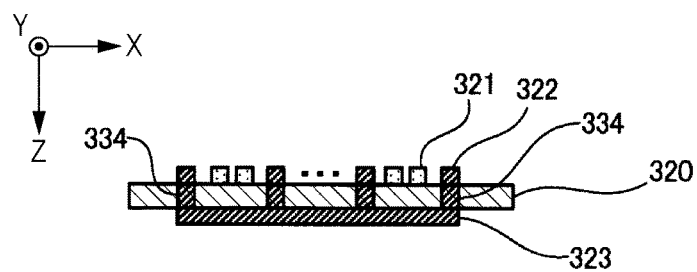
FIG. 7 is a sectional view taken along a line VII-VII of FIG. 6.
Figure 8:
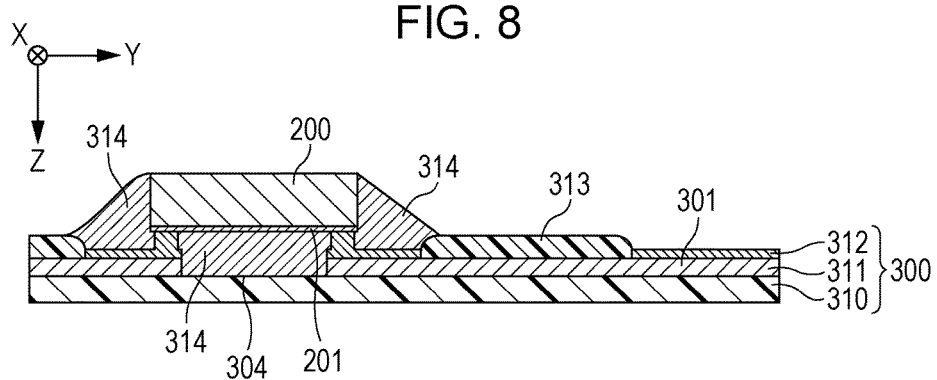
FIG. 8 is a sectional view taken along a line VIII-VIII of FIG. 6.
Figure 9:
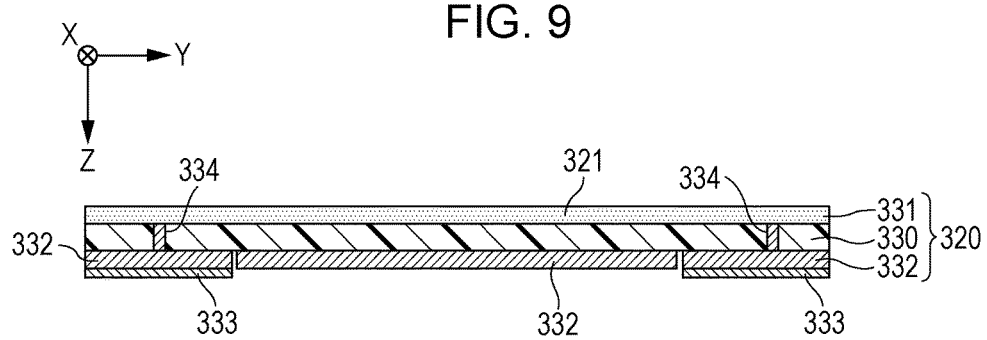
FIG. 9 is a sectional view taken along a line IX-IX of FIG. 6.
Figure 10:
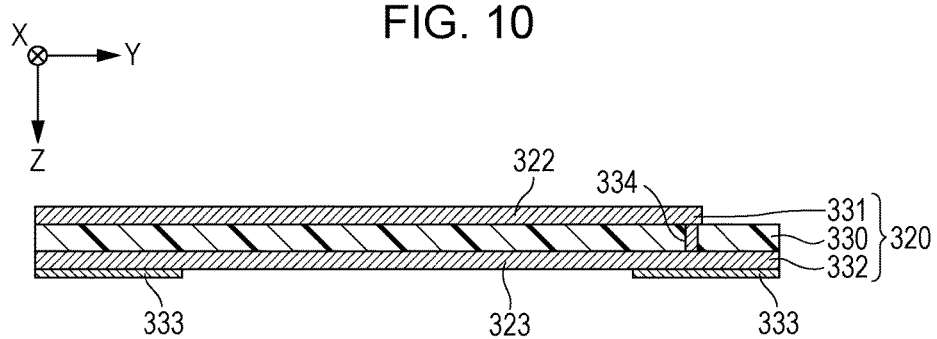
FIG. 10 is a sectional view taken along a line X-X of FIG. 6.

Next, the first flexible printed circuit board 300 and the second flexible printed circuit board 320 according to the present embodiment will be described in detail with reference to FIGS. 6 to 12. FIG. 6 is a plan view of the electro-optical device 1 connected to the board 400 of the host CPU apparatus illustrated in FIG. 1 when seen from the Z direction illustrated in FIG. 1, and FIG. 7 is a sectional view taken along a line VII-VII of FIG. 6. FIG. 8 is a sectional view taken along a line VIII-VIII of FIG. 6, and FIG. 9 is a sectional view taken along a line IX-IX of FIG. 6. FIG. 10 is a sectional view taken along a line X-X of FIG. 6.

As illustrated in FIG. 6, one end of the first flexible printed circuit board 300 is connected to the electro-optical panel 100, and one end of the second flexible printed circuit board 320 is connected to the board 400 of the host CPU apparatus as an external apparatus via the connector 500. The other end of the first flexible printed circuit board 300 and the other end of the second flexible printed circuit board 320 are pressed and connected to each other.

As illustrated in FIG. 8, which is a sectional view taken along the line VIII-VIII of FIG. 6, the first flexible printed circuit board 300 is configured with a base 310 made of polyimide or the like, a copper foil 311 as a wiring layer formed on the base 310, and an Au plating 312 for forming connection terminals. In addition, a solder resist 313 is appropriately provided on the copper foil 311. In this manner, the first flexible printed circuit board 300 is a so-called single-sided wiring board with a single-layered wiring layer.

The driving integrated circuit 200 is adhered to an adhesion surface 304 of the first flexible printed circuit board 300 by an underfill 314 as an adhesive having a predetermined dielectric constant. The underfill 314 is provided so as to cover a connection portion between a terminal of the driving integrated circuit 200 and a connection terminal formed by the Au plating 312.

As illustrated in FIG. 6, the wiring layer formed by the copper foil 311 of the first flexible printed circuit board 300, includes the first video signal wirings 301 for supplying the video signal Vid-in to the driving integrated circuit 200, and the first ground wirings 302 connected to the ground potential. Since the video signal Vid-in is supplied as a differential signal, two wirings are paired. The first ground wirings 302 are disposed on both sides of one pair of the first video signal wirings 301 (both sides in an X direction of FIG. 6).

As illustrated in FIG. 9 which is a sectional view taken along the line IX-IX' of FIG. 6, and FIG. 10 which is a sectional view taken along the line X-X of FIG. 6, the second flexible printed circuit board 320 includes a base 330 made of polyimide or the like. A copper foil 331 as a first wiring layer is formed on a surface of the base 330 (surface when seen from the Z direction of FIGS. 6 and 9), and a copper foil 332 as a second wiring layer is formed on a back surface of the base 330 (back surface when seen from the Z direction of FIGS. 6 and 9). An Au plating 333 for forming connection terminals is formed on the back surface of the copper foil 332 as the second wiring layer. In this manner, the second flexible printed circuit board 320 is a so-called double-sided wiring board with a two-layered wiring layer.

As illustrated in FIG. 6, the first wiring layer formed by the copper foil 331 of the second flexible printed circuit board 320, includes the second video signal wirings 321 to which the video signal Vid-in is supplied from the board 400 of the host CPU apparatus as an external apparatus, and the third ground wirings 322. Since the video signal Vid-in is supplied as a differential signal, two wirings are paired. The third ground wirings 322 are disposed on both sides of one pair of the second video signal wirings 321 (both sides in the X direction of FIG. 6). Here, as illustrated in FIGS. 6 and 10, the third ground wirings 322 are formed so as to have a length shorter than that of the second video signal wirings 321 and have a predetermined space between the third ground wirings 322 and the connector 500, instead of being formed so as to have a length equal to that of the second video signal wirings 321 (a length in a Y direction of FIGS. 6 and 10).

As illustrated in FIGS. 9 and 10, in the second flexible printed circuit board 320, the Au plating 333 for forming connection terminals is formed on the back surface of the base 330 (back surface when seen from the Z direction of FIGS. 9 and 10). The Au plating 333 for forming connection terminals is connected to the second video signal wirings 321 via the copper foil 332 and through-holes 334.

As illustrated by a two-dot chain line of FIG. 6, the copper foil 332 as the second wiring layer that is formed on the back surface of the base 330 (back surface when seen from the Z direction of FIG. 6) includes the second ground wiring 323. As illustrated in FIG. 6 and FIG. 7 which is a sectional view taken along the line VII-VII of FIG. 6, the second ground wiring 323 is formed at a position opposite to the second video signal wirings 321 when seen from the Z direction of FIGS. 6 and 7. As illustrated in FIGS. 7 and 10, the second ground wiring 323 is connected to the third ground wirings 322 via the through-holes 334.

Figure 11:
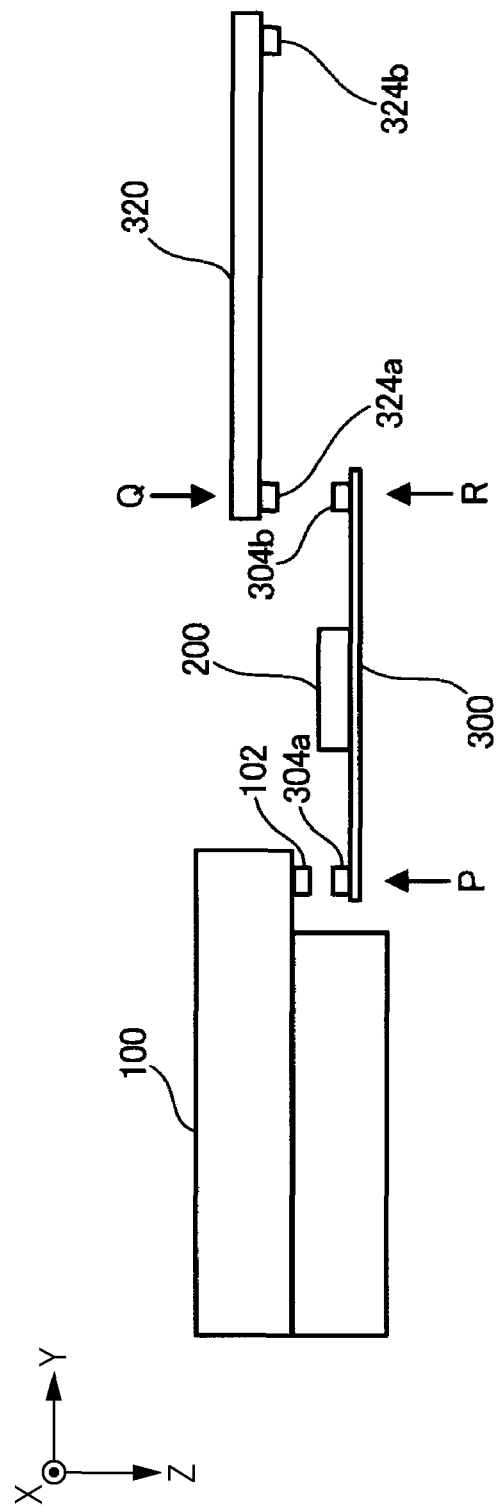
FIG. 11 is a diagram for explaining a method of connecting a first flexible printed circuit board and an electro-optical panel, and a method of connecting the first flexible printed circuit board and a second flexible printed circuit board.
Figure 12:
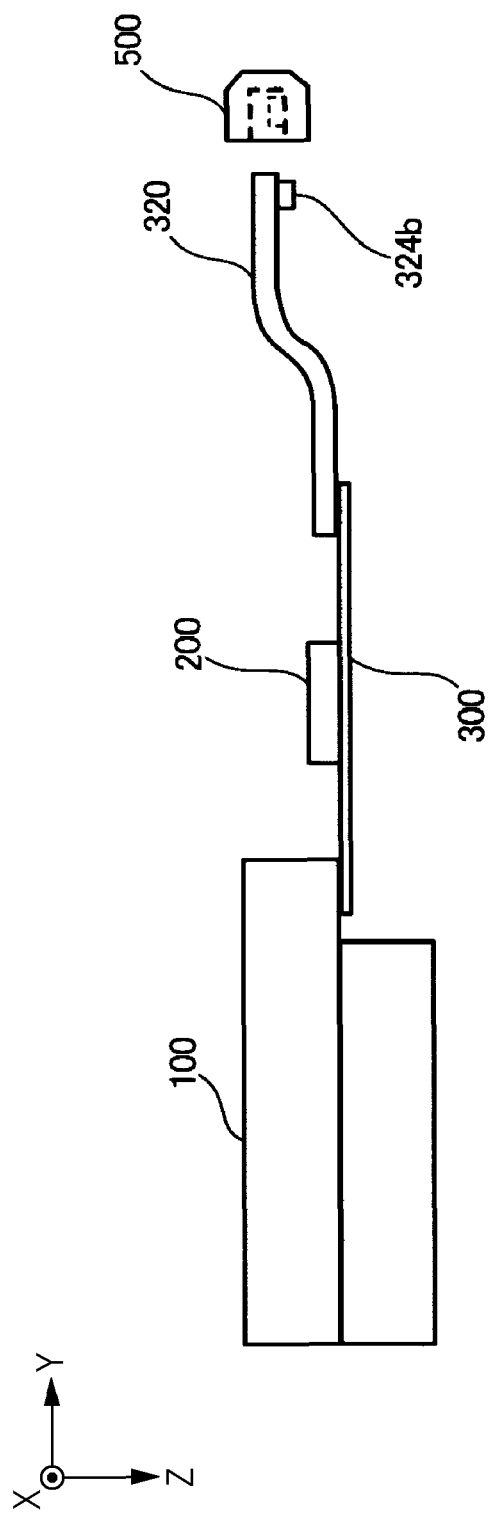
FIG. 12 is a diagram for explaining a method of connecting the second flexible printed circuit board and a connector.

Next, a method of connecting the first flexible printed circuit board 300 and the electro-optical panel 100, a method of connecting the first flexible printed circuit board 300 and the second flexible printed circuit board 320, and a method of connecting the second flexible printed circuit board 320 and the connector 500 will be described with reference to FIGS. 11 and 12. FIG. 11 is a diagram for explaining the method of connecting the first flexible printed circuit board 300 and the electro-optical panel 100, and the method of connecting the first flexible printed circuit board 300 and the second flexible printed circuit board 320. FIG. 12 is a diagram for explaining the method of connecting the second flexible printed circuit board 320 and the connector 500.

As illustrated in FIGS. 11 and 12, on an end portion of the surface of the first flexible printed circuit board 300 (surface when seen from the Z direction illustrated in FIGS. 11 and 12) that is positioned toward the electro-optical panel 100 side (that is, a left end portion in FIG. 11), a plurality of connection terminals 304a connected to the first video signal wirings 301 and the first ground wirings 302 are formed. The connection terminals 304a are formed by the Au plating 312 illustrated in FIG. 8. In addition, on an end portion of the surface of the first flexible printed circuit board 300 that is positioned toward the second flexible printed circuit board 320 side (that is, a right end portion in FIG. 11), a plurality of connection terminals 304b connected to the first video signal wirings 301 and the first ground wirings 302 are formed. The connection terminals 304b are formed by the Au plating 312 illustrated in FIG. 8.

On an end portion of the back surface of the second flexible printed circuit board 320 (back surface when seen from the Z direction illustrated in FIGS. 11 and 12) that is positioned toward the first flexible printed circuit board 300 side (that is, a left end portion in FIG. 11), a plurality of connection terminals 324a connected to the second video signal wirings 321, the third ground wirings 322, and the second ground wiring 323 are formed. The connection terminals 324a are formed by the Au plating 333 illustrated in FIGS. 9 and 10. In addition, on an end portion of the back surface of the second flexible printed circuit board 320 that is positioned toward the connector 500 side (that is, a right end portion in FIG. 11), a plurality of connection terminals 324b connected to the second video signal wirings 321 and the second ground wiring 323 are formed. The connection terminals 324b are formed by the Au plating 333 illustrated in FIGS. 9 and 10.

The first flexible printed circuit board 300 and the second flexible printed circuit board 320 configured as described above are pressurized in directions indicated by arrows Q and R in FIG. 11 during manufacturing, and are connected to each other by pressing or hot-pressing. As a result, the connection terminals 304b of the first flexible printed circuit board 300 and the connection terminal 324a of the second flexible printed circuit board 320 are connected to each other, and the first video signal wirings 301 and the second video signal wirings 321 are connected to each other. In addition, similarly, the first ground wirings 302 and the third ground wirings 322 are connected to each other.

As illustrated in FIG. 11, the first flexible printed circuit board 300 is pressurized with respect to the electro-optical panel 100 in a direction indicated by an arrow P in FIG. 11, and the first flexible printed circuit board 300 and the electro-optical panel 100 are connected to each other by pressing or hot-pressing. As a result, the external circuit connection terminals 102 of the electro-optical panel 100 and the connection terminals 304a of the first flexible printed circuit board 300 are connected to each other, and the electro-optical panel 100 and the driving integrated circuit 200 are electrically connected to each other.

As described above, the electro-optical device 1 including the electro-optical panel 100, the first flexible printed circuit board 300, the second flexible printed circuit board 320, and the driving integrated circuit 200 is assembled. When mounting the electro-optical device 1 on the host CPU apparatus, as illustrated in FIG. 12, a tip portion of the second flexible printed circuit board 320 is inserted into the connector 500. As a result, the connection terminals 324b of the second flexible printed circuit board 320 are connected to signal terminals of the connector 500 connected to signal wirings of the board 400 of the host CPU apparatus, and ground terminals of the connector 500 connected to the ground potential of the board 400 of the host CPU apparatus. Thus, the second video signal wirings 321 and the signal wirings on the host CPU apparatus side are connected to each other. In addition, the second ground wiring 323 is connected to the ground potential on the host CPU apparatus side.

As illustrated in FIG. 6, the second video signal wirings 321 to which the video signal as a differential signal is supplied from the board 400 of the host CPU apparatus, are paired in a unit of one pair of signal wirings. Thus, the signal terminals of the connector 500 are also paired in a unit of one pair of signal terminals, and are provided according to the number of the second video signal wirings 321. In the present embodiment, the second ground wiring 323 is provided in common on the back surface of the second flexible printed circuit board 320, instead of being provided on both sides of one pair of the second video signal wirings 321. Thus, there is no need to provide the ground terminals of the connector 500 independently on both sides of each pair of the signal terminals. For example, the ground terminals of the connector 500 may be provided at a left end portion and a right end portion of the connector 500 in the X direction illustrated in FIG. 6. Therefore, in the present embodiment, it is possible to reduce the number of the ground terminals of the connector 500.

In the present embodiment, the connection terminals 304a and 304b of the first flexible printed circuit board 300 are provided on the front surface of the first flexible printed circuit board 300, and the connection terminals 324a and 324b of the second flexible printed circuit board 320 are provided on the back surface of the second flexible printed circuit board 320. On the other hand, a position at which each connection terminal is provided can be appropriately changed.

As described above, according to the present embodiment, the first flexible printed circuit board 300 as a single-sided wiring board and the second flexible printed circuit board 320 as a double-sided wiring board are connected to each other, and the first video signal wirings 301 and the second video signal wirings 321 are respectively disposed on the surface of the first flexible printed circuit board 300 and the surface of the second flexible printed circuit board 320. In addition, the second ground wiring 323 which is opposite to the second video signal wirings 321, is disposed on the back surface of the second flexible printed circuit board 320.

The first video signal wirings 301 and the second video signal wirings 321 are paired in a unit of one pair of signal wirings, and the video signal as a differential signal is supplied since a large amount of data is required. From a viewpoint of impedance matching and EMI suppression, it is necessary to provide a ground wiring in the immediate vicinity of one pair of signal wirings to which the differential signal is supplied.

In the present embodiment, by providing the second ground wiring 323 on the back surface of the second flexible printed circuit board 320, instead of providing the second ground wiring 323 on both sides of one pair of the second video signal wirings 321, it is possible to realize impedance matching and EMI suppression. As a result, in the connector 500, there is no need to provide ground terminals corresponding to the second ground wiring 323 on both sides of one pair of signal terminals corresponding to one pair of second video signal wirings 321, and thus it is possible to reduce the number of the ground terminals of the connector 500.

Figure 18:
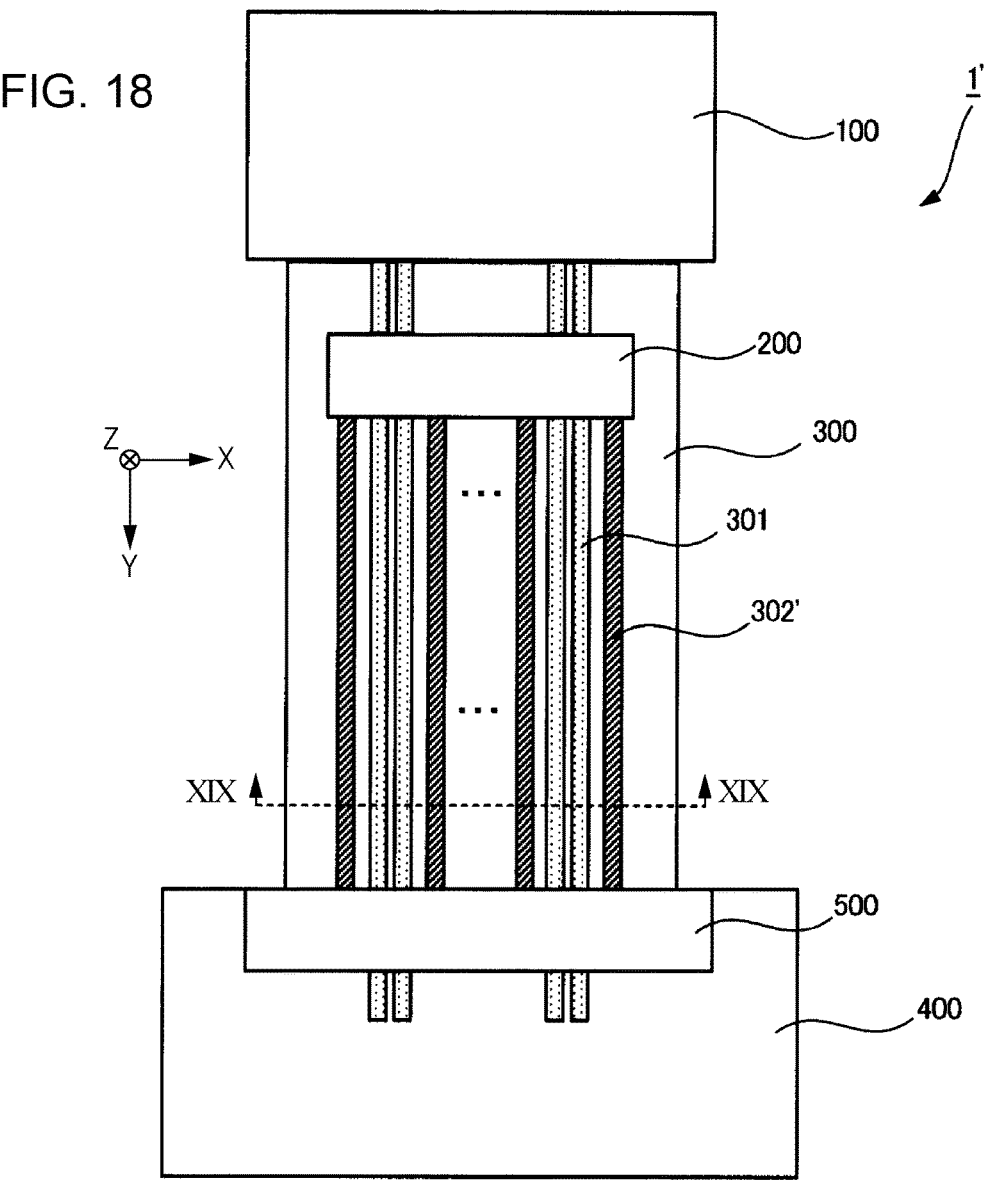
FIG. 18 is a plan view of the electro-optical device, which is connected to the board of the host CPU apparatus, according to a comparative example.
Figure 19:
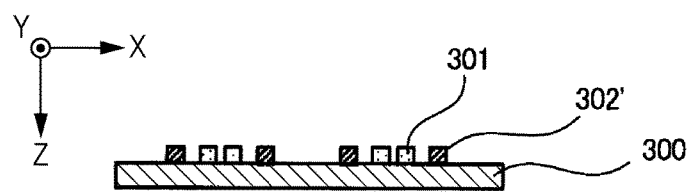
FIG. 19 is a sectional view taken along a line XIX-XIX of FIG. 18.

FIGS. 18 and 19 illustrate comparative examples. FIG. 18 is a plan view illustrating the electro-optical device 1', which is connected to the board 400 of the host CPU apparatus, according to a comparative example, and FIG. 19 is a sectional view taken along a line XIX-XIX of FIG. 18.

As illustrated in FIGS. 18 and 19, only the first flexible printed circuit board 300 as a single-sided wiring board is used, and one pair of first video signal wirings 301 and one pair of ground wirings 302' provided on both sides of the one pair of first video signal wirings 301, are provided on the surface of the first flexible printed circuit board 300.

In a case of the configuration as in the comparative example, in the connector 500, it is necessary to provide one pair of ground terminals corresponding to the ground wirings 302' on both sides of one pair of signal terminals corresponding to one pair of first video signal wirings 301, and this leads to an increase in the number of the ground terminals of the connector 500.

As described above, according to the present embodiment, by connecting the first flexible printed circuit board 300 with a single-layered wiring layer and the second flexible printed circuit board 320 with two-layered wiring layer to each other, instead of configuring the entire of the flexible printed circuit board with a multilayered flexible printed circuit board, it is possible to realize the above-described configuration without significantly increasing a manufacturing cost. In addition, according to the present embodiment, on the back surface of the second flexible printed circuit board 320 as a double-sided board that is connected to the first flexible printed circuit board 300 as a single-sided wiring board, the second ground wiring 323 is disposed so as to be opposite to a plurality of pairs of second video signal wirings 321. Therefore, even in a case where the video signal as a differential signal is supplied to the plurality of pairs of second video signal wirings 321, it is possible to reduce the number of the ground terminals of the connector 500 while realizing impedance matching and EMI suppression. As a result, it is possible to improve layout efficiency of the second flexible printed circuit board 320.

In addition, in the present embodiment, on the front surface of the second flexible printed circuit board 320, the third ground wirings 322 are provided on both sides of the plurality of pairs of second video signal wirings 321 up to a position in the vicinity of the connector 500. Therefore, it is possible to reduce the number of the ground terminals of the connector 500 while realizing more effective impedance matching and EMI suppression. As a result, it is possible to improve layout efficiency of the second flexible printed circuit board 320.

Second Embodiment

Figure 13:
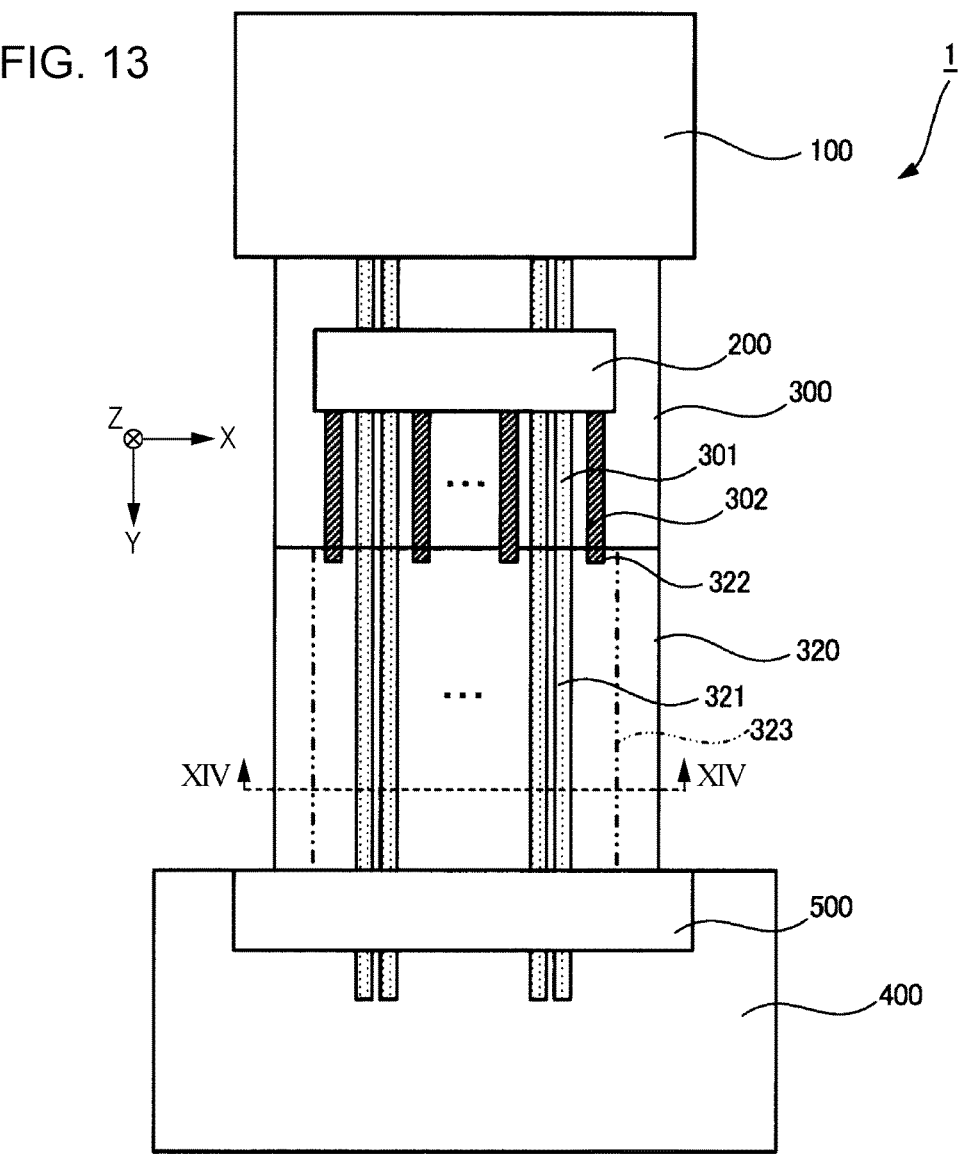
FIG. 13 is a plan view of the electro-optical device, which is connected to the board of the host CPU apparatus, according to a second embodiment of the invention.
Figure 14:
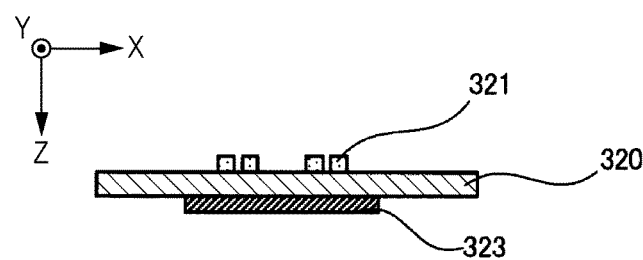
FIG. 14 is a sectional view taken along a line XIV-XIV of FIG. 13.

Next, a second embodiment according to the invention will be described with reference to FIGS. 13 to 14. FIG. 13 is a plan view illustrating the electro-optical device 1, which is connected to the board 400 of the host CPU apparatus, according to the present embodiment, and FIG. 14 is a sectional view taken along a line XIV-XIV of FIG. 13.

As illustrated in FIG. 13, in the present embodiment, on the front surface of the second flexible printed circuit board 320, the third ground wirings 322 are provided only in the vicinity of a portion in which the other end of the first flexible printed circuit board 300 and the other end of the second flexible printed circuit board 320 are connected to each other. In addition, the through-holes for connecting the second ground wiring 323 provided on the back surface of the second flexible printed circuit board 320 and the third ground wirings 322 to each other, are also provided only in the vicinity of a portion in which the other end of the first flexible printed circuit board 300 and the other end of the second flexible printed circuit board 320 are connected to each other.

In the present embodiment, on the front surface of the second flexible printed circuit board 320, only the second video signal wirings 321 are provided across the substantially entire area of the second flexible printed circuit board 320. Therefore, as illustrated in FIG. 14 which is a sectional view taken along the line XIV-XIV of FIG. 13, a microstrip line is formed of the second video signal wirings 321 and the second ground wiring 323 via the second flexible printed circuit board 320.

Even in the present embodiment, in a case where the video signal as a differential signal is supplied to the plurality of pairs of second video signal wirings 321, the second ground wiring 323 which is opposite to the second video signal wirings 321 is provided on the back surface of the second flexible printed circuit board 320, and thus it is possible to realize impedance matching and EMI suppression. In addition, in the present embodiment, it is possible to reduce the number of the ground terminals of the connector 500.

Particularly, in the present embodiment, on the front surface of the second flexible printed circuit board 320, the third ground wirings 322 are provided only in the vicinity of a portion in which the other end of the first flexible printed circuit board 300 and the other end of the second flexible printed circuit board 320 are connected to each other. Thus, it is possible to further improve layout efficiency of the second flexible printed circuit board 320. In addition, it is possible to increase a thickness of the wiring including the second video signal wirings 321.

MODIFICATION EXAMPLE

The invention is not limited to the above-described embodiment, and for example, various modifications to be described below may be made. In addition, it goes without saying that each embodiment and each modification example may be appropriately combined with each other.

Modification Example 1

In the above-described embodiments, although an aspect in which two-layer double-sided wiring board is used as the second flexible printed circuit board 320 has been described, the invention is not limited to the aspect. As the second flexible printed circuit board 320, a multi-layer board with two or more layers may be used.

Modification Example 2

In the above-described embodiment, although the liquid crystal is used as an example of an electro-optical material, the invention can also be applied to an electro-optical device using an electro-optical material other than the liquid crystal. The electro-optical material is a material of which the optical properties such as transmittance and luminance change by supply of an electric signal (current signal or voltage signal). For example, the invention can also be applied to a display panel using a light-emitting element such as an organic electroluminescent (EL), an inorganic EL, or a light-emitting polymer, as in the above-described embodiment. The invention can also be applied to an electrophoretic display panel using a microcapsule as an electro-optical material that includes a colored liquid and white particles dispersed in the liquid, as in the above-described embodiment. In addition, the invention can also be applied to a twisted ball display panel using a twist ball as an electro-optical material that is painted in different colors for each area with different polarity, as in the above-described embodiment. The invention can also be applied to various electro-optical devices such as a toner display panel using a black toner as an electro-optical material, or a plasma display panel using high-pressure gas such as helium or neon as an electro-optical material, as in the above-described embodiment.

Application Example

Figure 15:
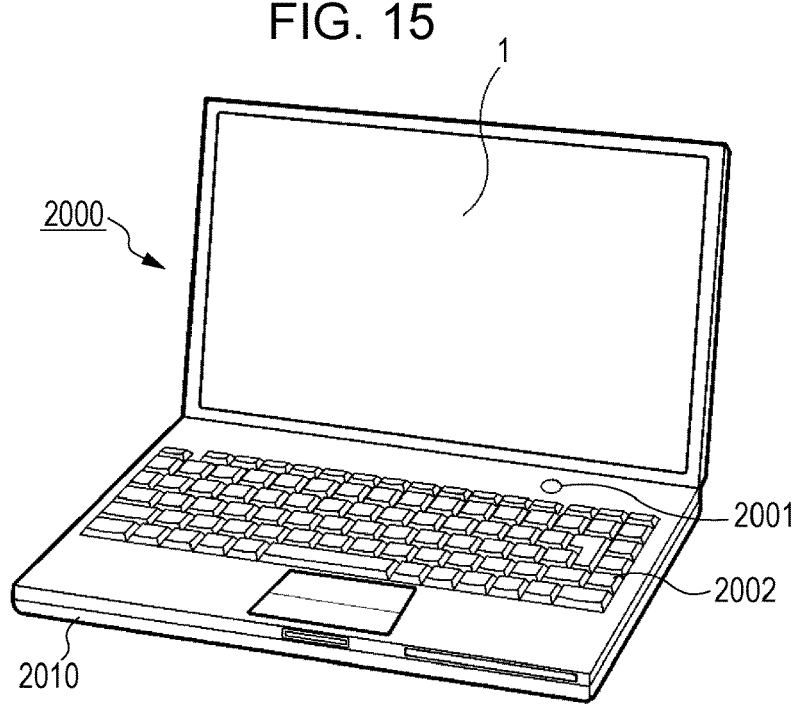
FIG. 15 is an explanatory diagram illustrating an example of an electronic apparatus.
Figure 16:
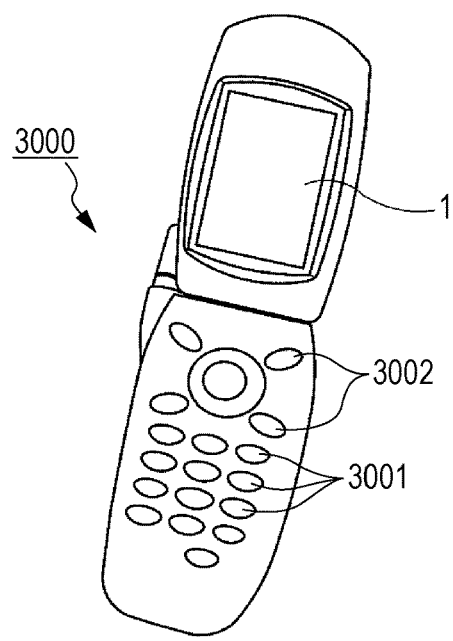
FIG. 16 is an explanatory diagram illustrating another example of an electronic apparatus.
Figure 17:
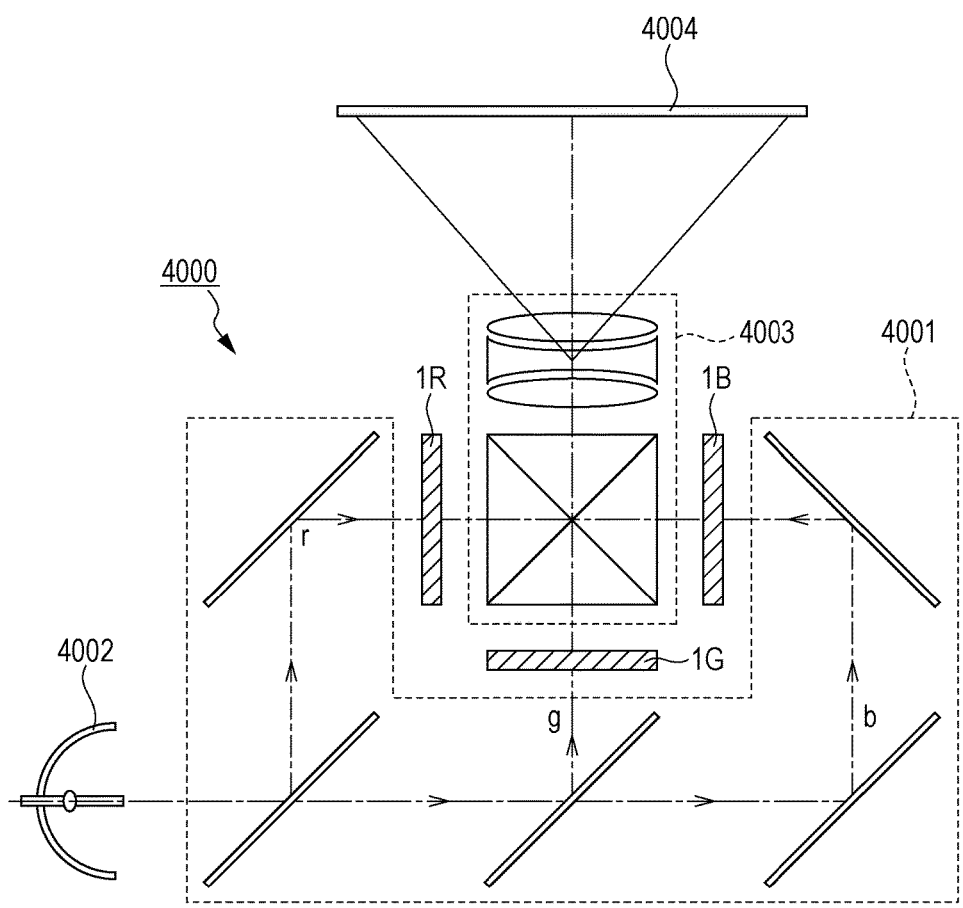
FIG. 17 is an explanatory diagram illustrating still another example of an electronic apparatus.

The invention can be used for various electronic apparatuses. FIGS. 15 to 17 illustrate specific forms of electronic apparatuses to which the invention is applied.

FIG. 15 is a perspective view of a portable personal computer to which an electro-optical device is adopted. The personal computer 2000 includes an electro-optical device 1 for displaying various images, and a main body unit 2010 on which a power switch 2001 and a keyboard 2002 are mounted.

FIG. 16 is a perspective view of a mobile phone. A mobile phone 3000 includes a plurality of operation buttons 3001 and scroll buttons 3002, and an electro-optical device 1 for displaying various images. When the scroll button 3002 is operated, a screen displayed on the electro-optical device 1 is scrolled. The invention can also be applied to such a mobile phone.

FIG. 17 is a schematic diagram illustrating a configuration of a projection type display apparatus (three-plate type projector) 4000 to which the electro-optical device is adopted. The projection type display apparatus 4000 includes three electro-optical devices 1 (1R, 1G, and 1B) corresponding to each of display colors R, G, and B different from each other. An illumination optical system 4001 supplies red components r of light emitted from an illumination device (light source) 4002 to the electro-optical device 1R, supplies green components g of the light to the electro-optical device 1G, and supplies blue components b of the light to the electro-optical device 1B. Each of the electro-optical devices 1 functions as an optical modulator (light valve) that modulates monochromatic light supplied from the illumination optical system 4001 according to the display image. A projection optical system 4003 combines the light emitted from the respective electro-optical devices 1, and projects the combined light on a projection surface 4004. The invention can also be applied to such a liquid crystal projector.

The electronic apparatuses to which the invention is applied include a personal digital assistants (PDA), in addition to the apparatuses illustrated in FIG. 1, and FIGS. 15 to 17. Further, the electronic apparatuses include a digital still camera, a television, a video camera, a car navigation apparatus, an in-vehicle display apparatus (instrument panel), an electronic organizer, an electronic paper, a calculator, a word processor, a workstation, a video phone, and a POS terminal. Furthermore, the electronic apparatuses include a printer, a scanner, a copier, a video player, an apparatus including a touch panel, and the like.

This application claims priority to Japan Patent Application No. 2016-190419 filed Sep. 28, 2016, the entire disclosures of which are hereby incorporated by reference in their entireties.

What is claimed is:

1. An electro-optical device comprising:
an electro-optical panel;
a first flexible printed circuit board that includes one end connected to the electro-optical panel, and a single-layered wiring layer;
a second flexible printed circuit board that includes one end connected to the other end of the first flexible printed circuit board, the other end connected to an external apparatus from which a video signal is supplied, and a multilayered wiring layer; and
an integrated circuit that is disposed on the first flexible printed circuit board, and that generates an image signal for displaying an image on the electro-optical panel based on the video signal supplied from the external apparatus and outputs the image signal to the electrooptical panel,
wherein the single-layered wiring layer of the first flexible printed circuit board includes
a first video signal wiring through which the video signal is supplied to the integrated circuit; and
a first ground wiring that is connected to ground potential,
wherein the multilayered wiring layer of the second flexible printed circuit board includes
a first wiring layer and a second wiring layer,
wherein the first wiring layer includes a second video signal wiring connected to the first video signal wiring, and
wherein the second wiring layer includes a second ground wiring that is connected to the first ground wiring and is formed at a position opposite to the second video signal wiring, the second ground wiring and the second video signal wiring overlapping with each other in a direction perpendicular to the second wiring layer.

2. The electro-optical device according to claim 1,
wherein the first wiring layer further includes a third ground wiring connected to the first ground wiring, and
wherein the third ground wiring is connected to the second ground wiring via a through-hole.

3. The electro-optical device according to claim 2,
wherein the through-hole is provided in the vicinity of a portion in which the first flexible printed circuit board and the second flexible printed circuit board are connected to each other, and
wherein the second video signal wiring and the second ground wiring form a microstrip line.

4. The electro-optical device according to claim 1,
wherein the video signal is supplied from the external apparatus, as a differential signal.

5. An electronic apparatus comprising:
the electro-optical device according to claim 1.

* * * * *